Figure 1:
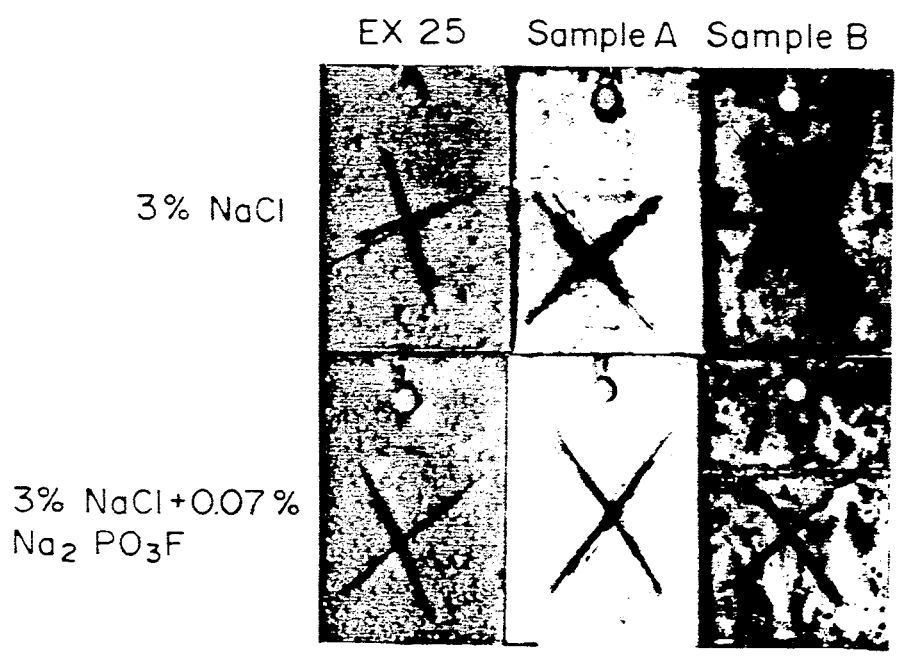

United States Patent [19]

Johnston et al.

[11] Patent Number: 5,127,954

[45] Date of Patent: Jul. 7, 1992

[54] CORROSION INHIBITING SYSTEMS, PRODUCTS CONTAINING RESIDUAL AMOUNTS OF SUCH SYSTEMS, AND METHODS THEREFOR

[75] Inventors: Allan Johnston, Palo Alto, Calif.; Dean Mason, Kirkland, Canada; Darren F. Lawless, Montreal, Canada; Terrence E. Peel, Hudson Heights, Canada

[73] Assignee: Domtar Inc., Montreal, Canada

[21] Appl. No.: 621,690

[22] Filed: Dec. 4, 1990

Related U.S. Application Data

[60] Division of Ser. No. 282,641, Dec. 12, 1988, Pat. No. 5,071,579, which is a continuation-in-part of Ser. No. 250,002, Aug. 29, 1988, which is a continuation-in-part of Ser. No. 134,089, Dec. 17, 1987, abandoned.

[51] Int. Cl.$^5$ ............................................. C04B 14/48
[52] U.S. Cl. ................................. 106/644; 106/14.12; 252/70; 252/387.2; 252/389.22
[58] Field of Search ..................... 106/14.12, 644, 713

[56] References Cited

U.S. PATENT DOCUMENTS 4,613,450 9/1986 Moran et al. ..................... 252/181

OTHER PUBLICATIONS

Duprat et al., "Inhibition of Corrosion of a Carbon Steel in Neutral Aerated Media by Monofluorophosphates", 1985, *Rev. Fr. Sci. Eau.*, 4(1), 1–15.

Moran et al., "Fluorophosphate Corrosion Inhibitor and Composition Containing It", 1983, *Fr. Demarde, 19 pp. (abstract of Fr patent 2527643 A1 Dec. 2, 1983)*.

Duprat et al., "Zinc and Potassium Monofluorophosphates as Corrosion Inhibitors of Carbon Steel in 3% Sodium Chloride Solution," 1983, *J. Appl. Electrochem.*, 13(3), 317–23.

Bonnel, A. et al., "Corrosion Resistance of Various Phosphate Coatings on a Carbon Steel: An Electrochemical Evaluation", 1981, Lab. Metall. Phys., Ec. Natl. Super. Chem. *Met. Corros. Proc.: Intl Congr. Met. Corros.* 8th, vol. 2, 1979–84.

*Primary Examiner*—William R. Dixon, Jr.
*Assistant Examiner*—Margaret V. Einsmann
*Attorney, Agent, or Firm*—Antoine H. Gauvin

[57] ABSTRACT

The corrosion inhibiting systems comprise at least one of the following: sodium fluorophosphate, and a water soluble salt of phosphonic acid derivatives having the general formula $R_nR_1N(CH_2PO_3H_2)_{2-n}$ wherein $R_n$ and $R_1$ are each independently selected from a member selected from the group consisting of alkyl, aminoalkyl and N-hydroxyalkyl and n is an integer selected from 1 and 0. The methods comprise laying on a surface a system as defined above. The invention also discloses deicers, paints and other corrosion inhibitors in numerous carriers. Products containing at least residual amounts of a system as defined above are also disclosed.

28 Claims, 1 Drawing Sheet

RESULTS OF COUPONS EXPOSED TO SALT

EX 25    Sample A    Sample B

3% NaCl

3% NaCl + 0.07%
Na$_2$PO$_3$F

CORROSION INHIBITING SYSTEMS, PRODUCTS CONTAINING RESIDUAL AMOUNTS OF SUCH SYSTEMS, AND METHODS THEREFOR

This invention is a divisional application of Ser. No. 282,641, filed Dec. 12, 1988 now U.S. Pat. No. 5,071,579, itself a continuation-in-part of application Ser. No. 07=250,002 filed Aug. 29, 1988 which is itself a continuation-in-part of application Ser. No. 07-134,089 filed Dec. 17, 1987 now abandoned. This invention relates to products and methods of inhibiting corrosion caused by chloride ions and the like, such as corrosion caused by corrosive deicers, acid rains and the like.

The expression "corrosion caused by chloride ions and the like" used throughout the disclosure and claims means, corrosion caused by, for instance, NaCl, CaCl$_2$, other corrosive deicers or any other products causing or susceptible of causing similar corrosion. It also means when dealing with corrosion inhibiting systems containing sodium fluorophosphate, that such systems containing sodium fluorophosphate must not be used to inhibit strong acidic corrosion, such as battery corrosion, since HF may be produced, said HF being corrosive This invention also relates to a plethora of carriers such as gaseous, liquid and solid carriers or diluents, including for sake of examples but not limited thereto, deicers, sand, solvents, diluents, coatings, paints, emulsions, suspensions, air jet applications, and the like comprising a new corrosion inhibiting system.

The corrosion inhibiting system is containing at least one member selected from the group consisting of sodium fluorophosphate (Na$_2$PO$_3$F which is also known under the name sodium monofluorophosphate), phosphonic acid derivatives as defined hereinbelow, and preferably systems involving sodium fluorosphosphate, alone or with sodium silicate.

The invention furthermore relates to the method of making the corrosion inhibiting systems, to the methods of use and to the products resulting therefrom containing at least residual amounts of the corrosion inhibiting systems.

The invention relates in particular, to new corrosion inhibiting systems and to corrosion inhibiting systems for reinforced concrete.

PRIOR ART

Sodium chloride is widely used as a deicer. Many means have been invented to overcome the corrosion problems associated to its use. For instance, the corrosion of rebars in concrete has been reduced by prior coating of the rebars with epoxy before concrete addition, or with cathodic protection.

The environment normally provided to reinforcing steel by the surrounding concrete is almost ideally suited for preventing corrosion of the steel. High quality concrete, properly placed, consolidated and cured provides a highly alkaline, low permeability covering for the steel which protects (passivates) against corrosion and minimizes penetration of corrosion inducing factors: oxygen, water and chloride. However, the entrance of moisture, electrolytes and oxygen by diffusion or through hairline cracks in the concrete can destroy the passive environment, establish galvanic corrosion cells and eventually destroy the concrete through the expansive forces created by the corroding steel. Chloride salts seem to be the most vigorous in providing this kind of attack. Thus, concrete structures with lower quality concrete or insufficient cover over rebars, and those exposed to severe conditions such as bridge decks subject to deicing salt application or marine environments, are particularly susceptible to rapid deterioration. The magnitude of this problem and the economic impact of repair and rebuilding of highway structures has led to extensive research into the electro-chemical behaviour of steel in concrete and possible solutions over the past 15 years. Past and present research efforts have focused on the importance of factors such as depth of cover, water/cement ratio, coated rebars, inhibitor admixtures for cement, low permeability concretes, etc. in new construction, and monitoring and repair techniques for existing structures, e.g. cathodic protection, membrane overlays.

The low corrosion rate of steel in uncontaminated concrete is due to the formation, in the presence of sufficient oxygen, of a stable, passive layer of gamma-Fe$_2$O$_3$ on the steel surface in the high pH (12–13) environment. There are two general mechanisms by which this passivating effect may be destroyed. (1) Reduction of the alkalinity by leaching of alkaline substances and/or partial reaction with CO$_2$, and (2) physical and electrochemical action involving chloride or other aggressive anions. Once the passitivity of the steel has been destroyed, the corrosion rate increases dramatically with the formation of micro and macrocorrosion cells. Oxidation of iron to ferrous ions and formation of oxides occurs at the anode (equation 1) while reduction of oxygen occurs at the cathode (equation 2).

$$Fe \rightarrow Fe^{2+} + 2e + O_2 \rightarrow Fe_3O_4 \quad (1)$$

$$\tfrac{1}{2}O_2 + H_2O + 2e \rightarrow 2OH^- \quad (2)$$

The anodic and cathodic areas of corroding steel may be widely separated. They depend upon differences in chloride or other anion, and oxygen concentrations and are affected by the pH near the steel/concrete interface.

THE INVENTION

Broadly stated, the invention is directed to new corrosion inhibitors and to new methods of inhibiting corrosion.

In a particular embodiment, applicant has invented a method of inhibiting corrosion caused or to be caused by chloride ions and the like, comprising laying on the surface of a reinforced concrete containing rebars, a corrosion inhibiting system containing at least one member selected from the group consisting of: sodium fluorophosphate (Na$_2$PO$_3$F also known as sodium monofluorophosphate which is the preferred member), and water soluble salts of phosphonic acid derivatives having the general formula R$_n$R$_1$N (CH$_2$PO$_3$H$_2$)$_{2-n}$, wherein R$_n$ and R$_1$ are each independently selected from a member selected from the group consisting of alkyl, aminoalkyl and hydroxyalkyl, and n is an integer selected from 1 and 0 and wherein in contact with water, said at least one member will inhibit the corrosion of said rebars. The water allows the displacement of the corrosion inhibiting system such as sodium fluorophosphate onto the rebars.

The invention is also directed to a deicer comprising a system having at least one member selected from the group consisting of:

sodium fluorophosphate, and phosphonic acid derivatives, as defined above.

Deicers are well known, by deicers it is meant in general, any product able to lower the freezing point of water and which possesses the other suitable characteristics necessary to not cause adverse substantial effects to the surrounding or its intended use. (For instance, it must not be slippery if the intended use is for roads). This includes glycols (e.g. ethylene glycols), calcium magnesium acetate, methanol, calcium chloride, magnesium chloride, urea, sodium formate and in general other deicers that are generally available. It also includes corrosive deicers, and applicant's corrosion inhibitors are particularly beneficial with such corrosive deicers.

Generally, the deicer comprising a corrosion inhibiting system contains at least 50% by weight of a deicer, and preferably at least 70%.

This invention is directed to a deicer comprising at least 85% by weight of a deicer and at least 0.25% by weight of a system containing sodium fluorophosphate.

The invention is also directed to a method to deice an outdoor surface, comprising laying over said surface one of the deicers as defined above.

The invention is also directed to a corrosion inhibitor system in a plethora of suitable carriers. As examples, the carrier may be a suitable vapour, liquid or solid phase. It includes, for sake of examples but is not limited to, deicers, paints, coatings, diluents, emulsions, suspensions, solvents and air jet applications.

Some preferred embodiments comprise aqueous solutions of sodium fluorophosphate, particularly sodium fluorophosphate and sodium silicate, more preferably substantially close to saturation, i.e. as close to saturation as possible to then be diluted upon use. Other preferred embodiments include coatings and paints comprising sodium fluorophosphate.

The invention is particularly useful to a surface exposed to air, chloride ions and the like, such as reinforced concrete surfaces, concrete containing iron, and to outdoor metals, such as metallic car structure, bridge structure, culvers, utility lines and particularly outdoor surfaces. It is also very useful for galvanized steel, and to a lesser extent for other metals, as well as to surfaces containing metals. Such exposed surfaces may be sprayed dry or wet, coated, painted, dipped in a container containing the corrosive inhibitor system.

By corrosive deicer as opposed to deicers, is meant a deicer susceptible of causing corrosion comprising salts such as sodium chloride, calcium chloride, magnesium chloride, potassium chloride, sodium formate, other corrosive deicers and other products having ions acting as the chloride ions.

By a corrosion inhibiting system containing fluorophosphate or alternatively a system containing fluorophosphate is meant fluorophosphate alone and in combination with other ingredients, such as for instance sodium silicate with or without other additives if desired: For instance, soil conditioners such as $CaSO_4$, urea, other mineral containing material, nitrogen substances and the like, in amounts that do not substantially affect the deicing characteristics of the deicer as discussed hereinbelow.

The invention is further directed to a method of inhibiting corrosion onto a metallic surface exposed to air, chloride ions and the like producing corrosion as caused by chloride ions, comprising laying on metallic surface to be exposed to air a system containing sodium fluorophosphate.

The invention is also directed to products containing at least residual amounts of the corrosion inhibiting systems, this means either in the form of corrosion inhibiting systems or as a residual amount resulting from the action of the corrosion inhibiting systems on the products or on a component of the products, or from ageing, washing, rains, etc. These products have generally outdoor surfaces exposed to air, chloride ions and the like. For example, concrete, rebars, metallic surfaces in general, bridge structures, metallic car structures and others as discussed throughout the specification and the like.

FIGURE

In the Figure which illustrates a particular embodiment of the invention, FIG. 1 represents the results obtained for the 2"×4" coupons after exposure to solutions of salt, and salt + $Na_2PO_3F$ respectively, according to Example 25 and as compared against prior art.

PREFERRED WAYS OF CARRYING OUT THE INVENTION

Preferably the invention is directed to deicers having reduced corrosion characteristics comprising common salt (NaCl), with at least 0.25% and preferably 2-5% by weight of a system containing sodium fluorosphosphate, with or without sodium silicate. The weight ratio of sodium fluorophosphate to sodium silicate may be for instance 1-10:1-2.5, but preferably about 1:1. These deicers are the most preferred, since the deicing property of the common salt is substantially maintained, while their corrosive characteristics are inhibited particularly with respect to the rebars when used in association with reinforced concrete.

There are a plethora of ways that can be used for the application of deicers. For instance, deicers could be used with sand. The deicer having reduced corrosion characteristics may be dry mixed or wet mixed, whether solid mixed or mixed in situ on locations where needed. For instance, it may be made by dry mixing sodium chloride with the system containing fluorophosphate. The system containing fluorophosphate may also for specific end uses be dissolved, suspended or emulsified in a suitable solvent or diluent, for instance water, glycols, sand, preferably with the least possible dilution, with enough water to obtain a viscosity whereby the system containing sodium fluorophosphate will be easily sprayable over the sodium chloride or sprayed against the sodium chloride whether at a plant or in a salt and/or sand dispensing vehicle, for instance such that said system impinges upon the sodium chloride and/or the sand before being laid over a surface, such as a concrete surface. The system may also be sprayed along with the sodium chloride, or the system may be distributed into the sodium chloride by any other means. The sodium chloride may be, for instance, brought by endless conveyors, such as belt conveyor or other means. Spraying of the system is done to obtain the desired levels, for instance 0.25-10% by weight, or higher if desired, and preferably 2-5% by weight of the system containing sodium fluorophosphate in the new deicer having reduced corrosion characteristics.

This deicer such as salt and the corrosion inhibitor system, having reduced corrosion characteristics, has nonetheless, the characteristics which are required of a good deicer substantially unaltered, such as: friction, freezing point, rate of ice penetration, and ice melting rate.

OTHER WAYS OF CARRYING OUT THE INVENTION

The deicer having corrosion characteristics may contain instead of sodium chloride other deicers as stated above and what has been said of sodium chloride may generally be said of these other corrosive deicers.

The corrosive deicers may not only contain fluorophosphate with or without sodium silicate although less preferred the corrosive deicers may be used with or without amides of a fatty acid, for instance, such as those having 8 to 24 carbon atoms, (e.g. cocoamide, at an acceptable toxicity level). Also, though less preferred, salt of derivatives of phosphonic acid as described above may be used. Typical examples of these derivatives of phosphonic acids include sodium salt or other compatible soluble salts of triethylenetetraminehexakis (methylene phosphonic acid), and sodium salt of ethylhexyliminobis (methylene phosphonic acid), or combination thereof.

A way of preparing these derivatives of phosphonic acid consists in reacting an amine, with formaldehyde and phosphonic acid. The deicer may be pelletized if desired.

The corrosion inhibitor systems described above may be used with or without deicers to inhibit corrosion. The corrosion inhibitor systems may also be present in a suitable carrier whether a gas, liquid or solid, such as an aqueous or other medium, forming solution with or without deicers, for instance, aqueous saturated solutions or as a coating, an emulsion suspension or a paint for some applications. The paint, the emulsion, the suspension or the coating may be used if desired for coating metals such as rebars, car structure, bridge structure, utility lines, culvers or other metallic outdoor surfaces. Air may also be used to disperse the corrosion inhibiting system as well as other suitable gases.

EXAMPLES

The following examples will now serve to illustrate particular embodiments of the invention, evidencing some of the novel deicers, the novel corrosion inhibitor systems, the novel methods and the novel uses as compared against prior art.

EXAMPLES 1-4

The test used was ASTM-G-31-72 as reapproved in 1985 on the corrosive deicers and with the systems described on Table 1. The corrosion rate resulting in weight loss is being expressed in mils per year (mpy). As can be easily seen, systems containing fluorophosphate and silicate have a significant positive effect in reducing corrosion as seen from the Examples.

TABLE 1

CORROSION RATE (TOTAL IMMERSION) OF STEEL (C1010 MILD STEEL) COUPONS IN 3% SALT SOLUTIONS

| Example No. | % Corrosive Deicer | Sodium fluorophosphate System: weight % | Corrosion rate (mpy) |
|---|---|---|---|
| 1 | 89.5 NaCl | 3 sodium fluorophosphate<br>5 sodium silicate<br>2.5 lignosulfonate | 0.84 |
| 2 | 87 NaCl<br>3.5 MgCl$_2$ | 3.5 sodium fluorophosphate<br>3.5 sodium silicate<br>2.5 lignosulfonate | 0.56 |
| 3 | 75 NaCl | 3 sodium fluorophosphate<br>3 sodium silicate | 0.81 |
| 4 | 16 CaSO$_4$<br>3 CaCl$_2$<br>77.5 NaCl<br>15 CaSO$_4$ | 2.5 sodium fluorophosphate<br>2.5 sodium silicate<br>1.25 cocoamide<br>1.25 a phosphonic acid derivative, namely: triethylene tetramine, hexakis (methylene phosphonic acid | 1.33 |
| Sample A | 100 NaCl | 0 | 2.32 |

EXAMPLE 5

The following illustrates the effect of pH on corrosion rate by sodium chloride alone, or with the following:

A: which is Na$_2$PO$_3$F, and
B: which is Na$_2$PO$_3$F:Na$_2$SiO$_3$Na lignosulfonate::
1:1:1 using the method as described for Examples 1-4.

| Inhibiting system % | pH 6 264 hrs | pH 6 693 hrs | pH 8 | pH 10 | pH 12 |
|---|---|---|---|---|---|
| 0 | 2.36 | 1.96 | 1.84 | 1.53 | 2.06 |
| 6% A | — | 0.53 | 0.49 | 0.96 | 1.26 |
| 4% A | 1.51 | 0.41 | 0.78 | 1.22 | 1.13 |
| 2% A | 1.95 | 0.68 | 0.89 | 1.28 | 1.04 |
| 6% B | — | 0.49 | 0.50 | 0.34 | 1.02 |
| 4% B | 0.68 | 0.34 | 0.52 | 0.53 | 1.19 |
| 2% B | 1.49 | 1.14 | 0.89 | 0.82 | 0.97 |

EXAMPLES 6-7

The following also demonstrates the reduced corrosion characteristics of a system comprising sodium chloride using the following procedure:

Rebar/concrete specimens were fabricated from $\frac{1}{2}$" rebar stock, and concrete with a mix design of 1:1:5 (Portland cement:water:sand). Sodium chloride was added to the mix water to yield a concrete chloride level of 20 lb/yd$^3$ Cl$^-$. Concrete cover was 5 mm, and exposed rebar area 14 cm$^2$. Corrosion rates were measured using AC impedance measurement method; in sequential AC impedance measurements, a sine wave of fixed amplitude, usually in the order of 10 mv, is applied to the embedded steel at decreasing frequencies and both the phase shift and modulus of impedance of the steel are monitored as a function of frequency. This teaching is described in F. Mansfeld, "Recording and Analysis of AC Impedance Data for Corrosion Studies - I", Corrosion - Nace, vol. 36 No. 5, pp. 301-307, May 1981, and vol. 38 No. 11, pp. 570-580, Nov. 1982, and K. Hladky, L. Callow, J. Dawson, "Corrosion Rates from Impedance Measurements: An Introduction", Br. Corro J., vol. 15, No. 1, pp. 20-25, 1980.

TABLE 2

| Example No. | 3% SALT SOLUTION | | |
|---|---|---|---|
| | % of components in deicer | Days of exposure | Corrosion rate (mpy) |
| 6 | 98 NaCl 2 Na₂PO₃F | 85 | 0.61 |
| 7 | 98 NaCl 2 phosphonic acid derivative as in Example 4 | 75 | 1.63 |
| Sample B | 100 NaCl | 85 | 2.38 |

EXAMPLES 8-19

In the following examples, corrosion current in MACROCELL corrosion test using reinforced concrete slabs was monitored as follows:

Two mats of rebars were cast in concrete using average quality air-entrained concrete. Various levels of sodium chloride were admixed into several of the top mat layers in order to accelerate corrosion and simulate the environment present in old bridge decks. A dam was placed on top of each slab and 6% solutions of deicer product ponded to a depth of ⅜". Solutions were replenished every 2 weeks.

The top and bottom sets of rebars were elecrically connected and a momentary off/on switch in series with a 1.0 ohm resistor installed between the two mats.

The corrosion current flowing between the top and bottom mats was measured as the voltage drop across the resistor when the switch is 'on' (normal position). The driving force (potential difference) between the top and bottom mats was measured as the "instant-off" potential between the 2 mats (switch momentarily depressed (off); voltage reading taken within 2 seconds). Corrosion potentials of the top mats were measured versus saturated calomel electrodes with the switch in the normal 'on' position.

In said table 3, [Cl⁻]means lb of chloride per cubic yard, the same batch being used for Examples 8, 12 and 16, as with Sample W, and so on.

ANALYSIS

An analysis of corrosion products on rebars of Sample C and Example 8 has been made.

The corrosion product layer of Sample C is composed mainly of iron oxides/hydroxides with small amounts of sodium and chlorine (from the solution) and silicon (silica from the aggregate mixture) present. The concrete side of the interface indicates that the calcium is present as both oxides/hydroxides and carbonates.

The corrosion product layer of Example 8 is more complex. The layer is quite thick, and has a higher calcium content than the non-inhibited surfaces. The calcium is present as calcium oxide/hydroxide with no indication of carbonate species present. There is also indications of appreciable amounts of chromium, nitrogen, and aluminium present in the film. Trace amounts of phosphorus were also detected.

As a tentative explanation only, it would appear that the action of the inhibitor may be an alteration of the local environment due to a reaction or prevention of a reaction with the concrete constituents. The major difference between the inhibited (Example 8) and non-inhibited (Sample C) is the amount and nature of the calcium present in the corrosion product films. Carbonation of the concrete layer, along with presence of chlorides, is an essential precursor for corrosion of the steel rebar. It was found that the inhibitor of the present invention affects this carbonation reaction and thus the mechanism for corrosion inhibition amounts to alteration of the local environment allowing the maintenance of a stable passive film rather than the incorporation of the inhibitor compound into the film to form a more protective layer on the surface.

TABLE 3

| | [Cl⁻] of top concrete lb/yd³ | Components of the deicer | % by weight of components | $i_{corr}$ (205 days) (micro amps) |
|---|---|---|---|---|
| Example | | | | |
| 8 | 0 | NaCl + A | 96:4 | 5 |
| 9 | 5 | NaCl + A | 96:4 | 83 |
| 10 | 10 | NaCl + A | 96:4 | 11 |
| 11 | 15 | NaCl + A | 96:4 | 23 |
| 12 | 0 | NaCl + A + B + C | 96:1.33:1.33:1.33 | 13 |
| 13 | 5 | NaCl + A + B + C | 96:1.33:1.33:1.33 | 144 |
| 14 | 10 | NaCl + A + B + C | 96:1.33:1.33:1.33 | 40 |
| 15 | 15 | NaCl + A + B + C | 96:1.33:1.33:1.33 | 242 |
| 16 | 0 | NaCl + A + D + E | 96:1.33:1.33:1.33 | 22 |
| 17 | 5 | NaCl + A + D + E | 96:1.33:1.33:1.33 | 190 |
| 18 | 10 | NaCl + A + D + E | 96:1.33:1.33:1.33 | 3 |
| 19 | 15 | NaCl + A + D + E | 96:1.33:1.33:1.33 | 134 |
| Sample | | | | |
| C | 0 | NaCl | 100 | 205 |
| D | 5 | NaCl | 100 | 205 |
| E | 10 | NaCl | 100 | 131 |
| F | 15 | NaCl | 100 | 293 |

In the components of the deicer as referred to in the column above.
A = sodium fluorophosphate
B = cocoamide
C = phosphonic acid derivative - sodium of salt of triethylenetetiaminehexakis (methylene phosphonic acid)
D = sodium silicate
E = sodium lignosulfonate

EXAMPLE 20

The following will serve to illustrate the reduced corrosion characteristics of a 4% corrosive deicer solution. The * inhibition is calculated as a percentage of reduction of corrosion rate over the corrosion rate of the same deicer solution without the Na₂PO₃F system.

| Deicer | % Na₂PO₃F System | Average Corrosion Rate (mpy) | % Inhibition |
|---|---|---|---|
| 100 CaCl₂ | 0 | 2.75 | |
| 94 CaCl₂ | 6 Na₂PO₃F | 1.21 | 56 |
| 94 CaCl₂ | 6* | 1.19 | 56.7 |
| 100 MgCl₂ | 0 | 2.34 | |
| 94 MgCl₂ | 6 Na₂PO₃F | 1.35 | 42.3 |
| 94 MgCl₂ | 6* | 1.38 | 41 |

EXAMPLE 21

The following will serve to illustrate the effect of the concentration of Na₂PO₃F system over time using a 4% sodium chloride deicer solution defined as follows:

| Deicer | % Na$_2$PO$_3$F System | Corrosion Rate (mpy) 264 hrs | 639 hrs |
|---|---|---|---|
| 100 NaCl | | 2.36 | 1.96 |
| 96 NaCl | 4 Na$_2$PO$_3$F | 1.51 | 0.41 |
| 98 NaCl | 2 Na$_2$PO$_3$F | 1.95 | 0.68 |
| 96 NaCl | 4* | 0.68 | 0.34 |
| 98 NaCl | 2* | 1.14 | 1.49 |

*Na$_2$PO$_3$F + Na$_2$SiO$_3$ + sodium lignosulfonate in a weight ratio of 1:1:1.

EXAMPLE 22

The following will serve to illustrate the reduced corrosion characteristics of the preferred corrosive deicer on various metals.

| NaCl Deicer | Na$_2$PO$_3$F System | Corrosion rate (mpy) Mild Steel | Galvanized Steel | Aluminum |
|---|---|---|---|---|
| 100% | | 2.36 | 2.65 | 0.71 |
| 97% | 1% lignosulfonate 1% Na$_2$SiO$_3$ 1% Na$_2$PO$_3$F | 0.76 | 1.93 | 0.20 |
| 99% | 1% lignosulfonate | 1.86 | 1.69 | 0.66 |
| 99% | 1% Na$_2$SiO$_3$ | 1.09 | 3.48 | 0.97 |
| 99% | 1% Na$_2$PO$_3$F | 2.25 | 1.21 | 0.20 |

EXAMPLES 23-24

The following will serve to illustrate that the reduced corrosion characteristics of deicers having Na$_2$PO$_3$F and Na$_2$SiO$_3$ and/or lignosulfonate is due to Na$_2$PO$_3$F alone or with Na$_2$SiO$_3$ and not to the lignosulfonate.

The inhibitor mixture of Na$_2$PO$_3$F and Na$_2$SiO$_3$ was tested for its effect on a mild steel probe in a brine solution (Aqueous work - Example 23) and also on the corrosion of a rebar in a small rebar-concrete probe (Example 24).

23 - AQUEOUS WORK

Polarization resistance of cylindrical electrode of 1018 carbon steel 0.9 cm in diameter and 1.2 cm in height immersed in 3% w/w NaCl + inhibitor as listed.

| Inhibitor | Concentration in Aqueous (w/w) | Cor. Rate (mpy) |
|---|---|---|
| None | — | 11.43 |
| Na$_2$SiO$_3$ + Na$_2$PO$_3$F | 0.024 0.024 | 4.66 |
| Na$_2$SiO$_3$ + Na$_2$PO$_3$F + Na Lignosulfonate | 0.024 0.024 0.024 | 7.06 |

24 - CONCRETE PROBES

Rebar/concrete specimens were fabricated as in Examples 6 and 7, from ½" rebar stock and concrete with a mix design 1:1:5 (Portland cement:water:sand). Concrete cover was 5 mm, and exposed rebar area ~35 cm$^2$. The probes were exposed to 3% NaCl + inhibitor (at concentration noted) solutions for the number of days listed and subsequently analyzed (corrosion rate) using the AC impedance technique.

| Probe | Inhibitor | Concentration in Aqueous Solution (w/w) | Days of Exposure | Corrosion Rate (mpy) | Ave. |
|---|---|---|---|---|---|
| 1 | None | | 39 | 4.04 | 3.09 |
| 2 | None | | 40 | 2.14 | |
| 3 | Na$_2$PO$_3$F + Na$_2$SiO$_3$ | 0.024 0.024 | 40 | 0.34 | 0.32 |
| 4 | Na$_2$PO$_3$F + Na$_2$SiO$_3$ | 0.024 0.024 | 40 | 0.31 | |
| 5 | Na$_2$PO$_3$F + Na$_2$SiO$_3$ + Lignosulfonate | 0.024 0.024 0.024 | 41 | 1.72 | 1.54 |
| 6 | Na$_2$PO$_3$F + Na$_2$SiO$_3$ + Lignosulfonate | 0.024 0.024 0.024 | 42 | 1.37 | |

EXAMPLE 25

This illustrates the corrosion inhibiting characteristics of coatings such as a paint having a sodium fluorophosphate system.

For purposes of this experiment the arbitrary quantity of 2% (w/w paint) Na$_2$PO$_3$F was added to professional paint interior oil-based semi-gloss paint and 1"×2" and 2" × 4" mild steel C1010 coupons were exposed to a cyclic immersion, humidity test procedure in accordance with ASTM standard D 1654. For comparative purposes Samples A and B were respectively treated with "Rustclad" and "Krylon" corrosion inhibiting paints.

The results indicated that Na$_2$PO$_3$F admixed paint performed better than did "Rustclad" and vastly outperformed "Krylon" treated specimens. One can easily infer from the above that other suitable emulsions and suspensions could also be used. In all cases corrosive effects were lower when immersion was in a salt + Na$_2$PO$_3$F solution.

EXPERIMENTAL

Painted 1"×2" and 2"×4" A109 cold rolled C1010 mild steel coupons were prepared by coating the specimens with 2 coats of "Rustclad" metal primer followed by 2 coats of the following paints:

Example 25: Professional paint interior oil-based semi-gloss (white) paint with 2% (w/w paint) Na$_2$PO$_3$F admixed.

Sample A: Rustclad (white gloss).
Sample B: Krylon (silver).

An "X" was scribed on one surface of each coupon with a sharp knife. The coupons were cycled through a schedule of 16 hours immersion in 3% deicer solution NaCl or NaCl + Na$_2$PO$_3$F (97.6:2.4) at 55° C. and 8 hours suspension over the solutions in the humid atmosphere over the 55° C. water bath (ASTM standard practice D 1654). Relative corrosivities were determined by a visual ranking of rust stain in accordance with guidelines listed in the ASTM procedure.

RESULTS

An evaluation of the corrosion damage in both the scribed and unscribed areas using the criteria established in ASTM D 1654 is listed under Scribed Area and Unscribed Area. FIG. 1 represents the results obtained for the 2"×4" coupons after exposure to solutions of salt, and salt + Na$_2$PO$_3$F respectively.

The results indicate that Na$_2$PO$_3$F has good corrosion inhibiting characteristics for paints Na$_2$PO$_3$F is relatively non-toxic whereas most corrosion inhibitors added to commercial paints are chromium based which is considered not only to be toxic but environmentally damaging.

EVALUATION OF SCRIBED AREA OF PAINTED COUPONS

| Treatment | Solution | Ranking 1" × 2" coupon | 2" × 4" coupon |
|---|---|---|---|
| Paint + Na₂PO₃F | 3% NaCl | 7 | 7 |
| Rustclad | 3% NaCl | 4 | 6 |
| Krylon | 3% NaCl | 0 | 3 |
| Paint + Na₂PO₃F | 3% NaCl + 0.074% | 7 | 9 |
| Rustclad | 3% NaCl | 5 | 8 |
| Krylon | 3% NaCl | 3 | 8 |
| Paint + Na₂PO₃F | 3% NaCl | 7 | 8 |
| Rustclad | 3% NaCl | 3 | 5 |
| Krylon | 3% NaCl | 0 | 2 |
| Paint + Na₂PO₃F | 3% NaCl + 0.074% | 7 | 8 |
| Rustclad | 3% NaCl | 4 | 8 |
| Krylon | 3% NaCl | 2 | 6 |

Having described the invention, numerous modifications will be evident to those skilled in the art without departing from the spirit of the invention, as defined in the appended claims.

We claim:

1. A reinforced concrete containing at least residual amounts of a deicer comprising a corrosion inhibiting system having at least sodium fluorophosphate.

2. The concrete as defined in claim 1, wherein said deicer comprising a corrosion inhibiting system contains at least 70% by weight of a deicer and at least 0.25% by weight of said corrosion inhibiting system containing sodium fluorophosphate.

3. The concrete as defined in claim 2, wherein said deicer comprising a corrosion inhibiting system contains at least 85% by weight of a deicer and at least 0.25% by weight of said corrosion inhibiting system containing sodium fluorophosphate.

4. The concrete as defined in claim 2, wherein said deicer is sodium chloride.

5. The concrete as defined in claim 2, wherein said corrosion inhibiting system is essentially sodium fluorophosphate.

6. The concrete as defined in claim 3, wherein said deicer is sodium chloride.

7. The concrete a defined in claim 2, wherein said deicer comprising a corrosion inhibiting system is essentially sodium chloride and sodium fluorophosphate.

8. The concrete as defined in claim 1, wherein said deicer comprising a corrosion inhibiting system contains at least 90% by weight of a deicer and from 0.25% to 10% by weight of said corrosion inhibiting system containing sodium fluorophosphate.

9. The concrete as defined in claim 2, wherein said corrosion inhibiting system contains sodium fluorophosphate and sodium silicate.

10. The concrete as defined in claim 9, wherein said deicer is at least one corrosive deicer selected from the group consisting of: sodium chloride, calcium chloride, magnesium chloride and potassium chloride.

11. The concrete as defined in claim 8, wherein said deicer is at least one corrosive deicer selected from the group consisting of: sodium chloride, calcium chloride, magnesium chloride and potassium chloride.

12. The concrete as defined in claim 2, wherein said corrosion inhibiting system is sodium fluorophosphate and sodium silicate in a weight ratio 1-10:1-2.5.

13. The concrete as defined in claim 2, wherein said corrosion inhibiting system is sodium fluorophosphate and sodium silicate in a weight ratio 1:1.

14. The concrete as defined in claim 1, wherein said deicer is a corrosive deicer having at least 95% by weight of sodium chloride and at least 0.25% by weight of said corrosion inhibiting system containing sodium fluorophosphate.

15. The concrete as defined in claim 14 having as corrosion inhibiting system, 3±0.5% by weight of a sodium fluorophosphate system.

16. The concrete as defined in claim 1, wherein said corrosion inhibiting system is sodium fluorophosphate, cocoamide and a phosphonic acid derivative.

17. The concrete as defined in claim 1, wherein said at least residual amounts of a deicer comprising a corrosion inhibiting system is dissolved in a suitable solvent.

18. The concrete as defined in claim 1, wherein said at least residual amounts of a deicer comprising a corrosion inhibiting system is dissolved in an aqueous medium in the form of a substantially saturated solution.

19. The concrete as defined in claim 1 which further includes at least one soil conditioner.

20. A reinforced concrete containing rebars, said concrete containing at least residual amounts of sodium fluorophosphate.

21. The reinforced concrete as defined in claim 20, wherein said sodium fluorophosphate is in a suitable carrier.

22. The concrete as defined in claim 21 comprising sodium fluorophosphate and sodium silicate.

23. The concrete as defined in claim 21 comprising sodium fluorophosphate and sodium silicate in a weight ratio of 1-10 to 1-2.5.

24. The concrete as defined in claim 24 wherein said weight ratio is about 1:1.

25. The concrete as defined in claim 21 comprising an aqueous solution of sodium fluorophosphate.

26. The concrete as defined in claim 25 being in said aqueous solution, at a concentration substantially close to saturation.

27. The concrete as defined in claim 21 comprising sodium fluorophosphate present in a member selected from the group consisting of emulsions and suspensions.

28. The concrete as defined in claim 21 wherein said carrier is sand.

* * * * *